United States Patent
Prahl et al.

[15] 3,673,262
[45] June 27, 1972

[54] CRYSTALLIZATION OF DIPHENYLOL ALKANES

[72] Inventors: Walter H. Prahl, Karlsruhe, Germany; Sol J. Lederman, Kenmore, N.Y.

[73] Assignee: Hooker Chemical Corporation, Niagara Falls, N.Y.

[22] Filed: Dec. 20, 1968

[21] Appl. No.: 785,619

Related U.S. Application Data

[63] Continuation-in-part of Ser. No. 177,078, March 2, 1962, abandoned, and a continuation-in-part of Ser. No. 569,541, May 31, 1966, abandoned.

[52] U.S. Cl. .........................................................260/619 A
[51] Int. Cl. ...............................................................C07c 37/22
[58] Field of Search ...........................................260/619 A

[56] References Cited

UNITED STATES PATENTS 2,959,622  11/1960  Grimme et al. ...................260/619 A Primary Examiner—Bernard Helfin
Attorney—Peter F. Casella, Donald C. Studley, Richard P. Mueller and James F. Mudd

[57] ABSTRACT

An unexpected marked increase in the solubility of a gem-diphenylol alkane at a temperature above near the atmospheric boiling point of a solvent selected from the group consisting of benzene, toluene, methylene chloride, ethylene dichloride, and trichloroethylene, enables a process for purifying the gem-diphenylol alkane by dissolving it in the solvent at a temperature above the atmospheric boiling point and at a pressure above the vapor pressure of the resultant material, cooling the resultant material, and recovering the resulting crystals of gem-diphenylol alkane therefrom.

28 Claims, 1 Drawing Figure 1. 1,2,4,5 TETRACHLOROBENZENE IN BENZENE
2. BISPHENOL B IN BENZENE
3. BISPHENOL A IN ETHYLENE DICHLORIDE
4. BISPHENOL A IN METHYLENE CHLORIDE
5. BISPHENOL A IN BENZENE
6. BISPHENOL A IN TOLUENE
7. BISPHENOL C IN BENZENE
8. BISPHENOL A IN TRICHLOROETHYLENE

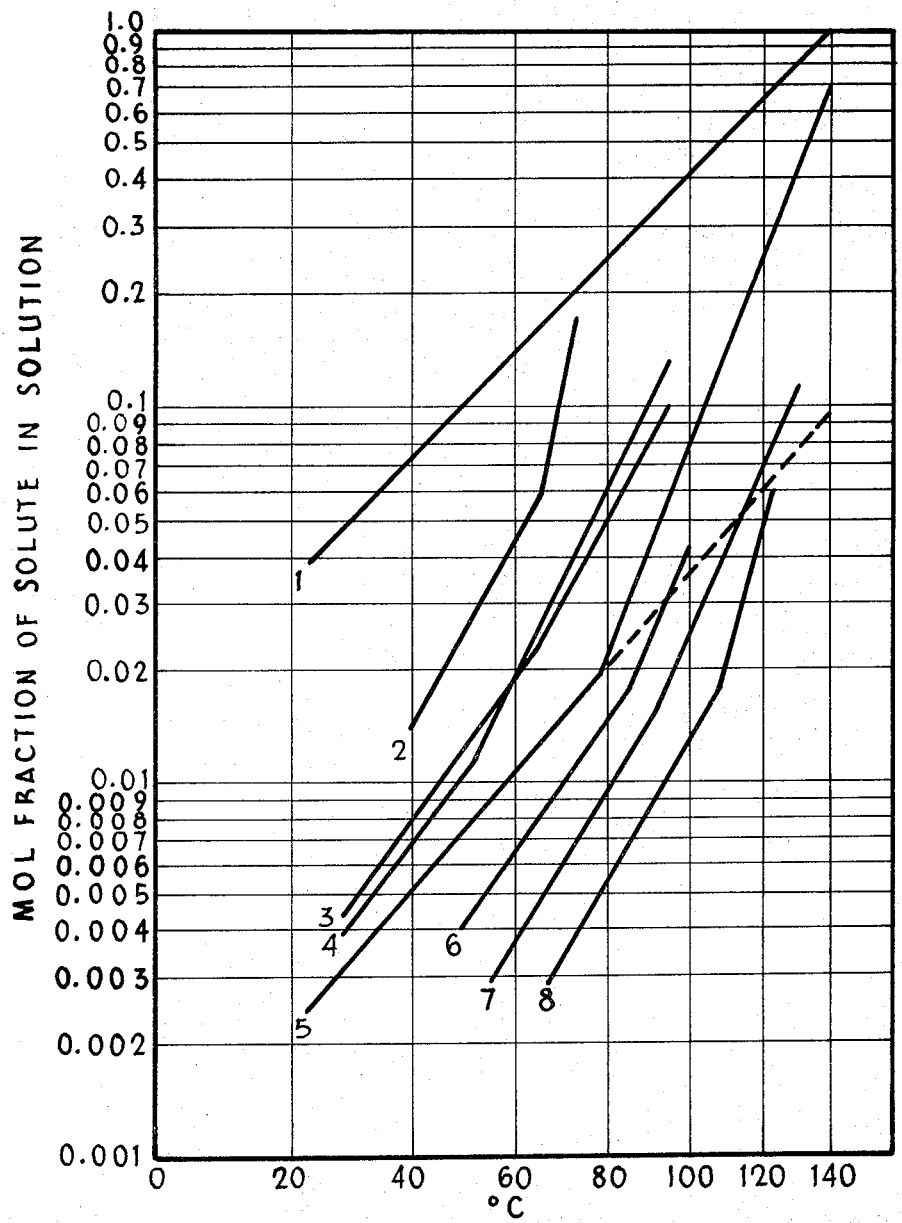

CRYSTALLIZATION OF DIPHENYLOL ALKANES

This is a continuation-in-part of copending application Ser. No. 177,078, filed Mar. 2, 1962, now abandoned, and Ser. No. 569,541, filed May 31, 1966 and now abandoned.

This invention refers to the purification of gem-diphenylol alkanes and more especially to the production of 2,2-bis(4-hydroxyphenyl) propane, commonly called "bisphenol-A," of a very high purity.

In the production of gem-diphenylol alkanes by the condensation of a phenol and an organic carbonyl compound, and specifically of 2,2-bis(4-hydroxyphenyl) propane by the condensation of phenol with acetone, a number of impurities are formed which can be grouped and classified as follows (using the impurities formed in the production of bisphenol-A as specific examples):

1. The o,o'-isomer of the gem-diphenylol alkane, e.g., 2,2-(2,2'-dihydroxydiphenyl) propane.
2. The o,p'-isomer of the gem-diphenylol alkane, e.g., 2,2-(2,4'-dihydroxydiphenyl) propane. Melting point: 109° C. Boiling point at 0.25 mm Hg: 170° C.
3. The tris-phenolic nuclei materials probably formed by the condensation of three phenolic nuclei and two radicals of the organic carbonyl compound, e.g., (a) "Trisphenol I" whose formula is:

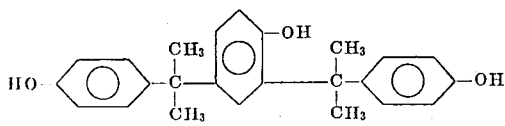

2,4-bis(α,α-dimethyl 4-hydroxybenzyl ) phenol. Melting point: 193° C. Boiling point at 0.25 mm Hg: 240°-245° C, e.g., (b) "Trisphenol II" whose formula is:

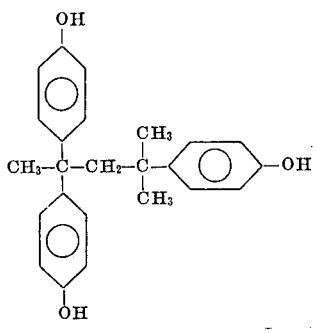

2,2,4-tris(4-hydroxyphenyl-4-methyl pentane.

4. The chroman materials, probably formed by the condensation of the organic carbonyl compound with itself and two phenolic nuclei, e.g., (a) "Chroman I" (also called the "codimer" or "Dianin's Compound"), whose formula is:

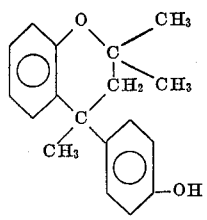

Melting point: 156° C. Boiling point at 0.25 mm Hg: 165°–170° C. 2,2,4-trimethyl-4-p-hydroxyphenyl chroman, e.g., (b) "Chroman II" (also called "o-dimer"), whose formula is:

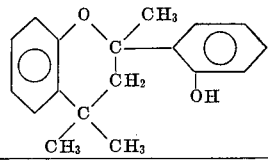

Melting point: 133° C. Boiling point at 0.2 mm Hg: 140° C. 2,4,4-trimethyl2-o-hydroxyphenyl chroman.

While the melting and boiling points have been given, where known, for the specific pure impurities found in the condensation of phenol and acetone, when these are in admixture with bisphenol-A, a different apparent melting point or boiling point results, depending on the amount of impurity present. That is, when a higher or lower boiling impurity is present in bisphenol-A, even in small amounts, the freeze point purity is lowered considerably.

The freezing point of a compound is generally given as an indication of the compound's purity. Generally, the freezing point constant, $K_f$, gives the depression of the freezing point in degrees centigrade produced by the solution of one gram molecular weight of a substance in 1,000 grams of the solvent. Pure bisphenol-A has a freeze point of approximately 157.3° C. and one gram molecular weight of any impurity dissolved in 1,000 grams of bisphenol-A lowers its freeze point approximately 10° C. Thus, the closer the freeze point of bisphenol-A is to 157.3° C., the purer is the product. Commercial specifications on bisphenol-A for some uses expect a freeze point purity of at least 156.7° C.

In the above examples and as used throughout this specification, the "freezing point" of bisphenol-A or other gem-diphenylol alkane is determined in the same standard manner as for other solids. The sample, for instance of bisphenol-A, is placed in a 20 × 50 mm test tube. The bisphenol-A is then heated to above its melting point, e.g., for bisphenol-A approximately 170° C. The test tube is then placed into a larger insulated test tube. The molten bisphenol-A is stirred constantly while the temperature is gradually reduced until crystals of bisphenol-A appear. Stirring is stopped. The temperature then rises from the heat of crystallization. The maximum temperature observed is given as the freeze point of the sample. This maximum temperature is also a temporary plateau in a time-temperature curve. A calibrated thermometer with a 130° to 175° C. range is used to determine the exact temperature of bisphenol-A and other gem-diphenylol alkanes melting in this range.

The color of a compound is sometimes used to give an indication of its purity. The standard color of bisphenol-A or other gem-diphenylol alkane is generally given as the color of a solution containing 50 grams of bisphenol-A and 50 milliliters of methanol, measured by using a colorimeter using a 425 millimicron filter. A cell is used which allows either a 50 millimeter or a 10 millimeter light path through the solution. The light transmission of the solution compared to the solvent considered as 100 percent transmission is given as the color intensity of the solution. Commercial specifications on bisphenol-A for some uses now expect a light transmission greater than 75 percent when using a 50 millimeter light path, or a light transmission greater than 95 percent when using a 10 millimeter light path.

As taught in U.S. Pat. No. 3,073,868, the impurities produced by the condensation of a phenol with an organic carbonyl compound to form a corresponding gem-diphenylol alkane, may comprise isomers, hemiacetals or similar compounds, and higher condensation products, such as those illustrated above, and still higher condensation products in the form of resins and tars.

EXAMPLE 1

In order to isolate and identify the impurities formed in the acid condensation of phenol with acetone to produce bisphenol-A, a series of batch experiments were made wherein the unreacted phenol and resin of each batch were recovered and recycled into the next batch. Samples of the crude, recovered resin and purified bisphenol-A were taken for gas chromatographic analyses. In these experiments, recovered phenol, recovered resin, fresh phenol and acetone were charged to a reactor. Hydrogen chloride gas was passed into the mixture until the reaction was completed. The unreacted phenol, hydrochloric acid and the water of reaction were then removed by distillation. The resulting "crude bisphenol-A" obtained after this operation was then subjected to a "flash" vacuum distillation. The bisphenol-A distillate was then further purified by treating with benzene in accordance with U.S. Pat. No. 3,073,868. A "purified bisphenol-A" was obtained. The benzene liquor was then distilled to separate the benzene from the resinous residue. The recovered phenol and the recovered resin from each batch were then used for the make-up of the next batch. In the first batch, 2,800 grams of fresh phenol and 290 grams of acetone were charged. In subsequent batches, an average of 1,700 to 1,750 grams of recovered phenol plus fresh phenol (making a total of 2,800 grams phenol charged per batch), an average of 75 to 200 grams of recovered resin, and 290 grams of acetone were charged. Table No. 1 contains a typical gas chromatographic analysis for the crude bisphenol-A (BPA), recovered resin and the purified bisphenol-A.

TABLE 1

Gas Chromatographic Analyses of Bisphenol-A Products

| | Impurities Present (% by weight) | | | | |
|---|---|---|---|---|---|
| | RECOV. RESIN | | CRUDE BPA | | Purified |
| | 1st Batch | Av. Recycled Batches | 1st Batch | Av. Recycled Batches | BPA % |
| Phenol | 5.51 | 28.22 | 1.40 | 1.84 | 0.04 |
| o,p'-BPA | 14.07 | 6.37 | 1.14 | 1.03 | 0.15 |
| Codimer | 7.68 | 26.63 | .60 | 3.89 | — |
| p,p'-BPA | 66.36 | 30.15 | 96.54 | 92.37 | 99.81 |
| Unknowns | 6.38 | 8.63 | .32 | .87 | — |
| Totals | 100.00 | 100.00 | 100.00 | 100.00 | 100.00 |

As taught in U.S. Pat. No. 3,073,868, the reaction mass is first subjected to a distillation to strip off the unreacted phenol, hydrochloric acid, water of reaction and any other impurities more volatile than bisphenol-A, to produce a so-called "crude bisphenol-A." However, as further taught in U.S. Pat. No. 3,073,868, it was found that only by using a "flash" distillation of this crude bisphenol-A and a solvent extraction of the resultant distilled bisphenol-A could a bisphenol-A of maximum purity be obtained. The high-boilers are left behind as a tar. This residue is discarded. This is illustrated in Example 2.

EXAMPLE 2

A crude bisphenol-A was treated with benzene only. The freezing point and color obtained after this treatment were compared to the original freezing point and color of the crude bisphenol-A. A sample of the crude bisphenol-A was then "flash" distilled and the resultant distilled bisphenol-A treated with benzene. The freezing point and color of this product were then compared to the crude to determine the improvement made in quality of the bisphenol-A. The results obtained from these experiments are summarized in Table No. II.

TABLE II

Purification of Crude Bisphenol-A by U.S. 3,073,868

| Bisphenol-A | Crude Bisphenol-A | Benzene Treatment | Flash Distillation + Benzene Treatment |
|---|---|---|---|
| Freezing Point | 153.3°C | 155.6°C | 156.8°C |
| Color | | | |
| 50 mm. Cell | <10% Trans. | <10% Trans. | >76% Trans |
| 10 mm. Cell | 20% Trans. | 43% Trans. | >96% Trans. |

There are numerous methods in the art for dealing with the impurities formed during the condensation of a phenol with an organic carbonyl compound, or with impurities introduced into the gem-diphenylol alkane later on, including treatment with an amine to form an adduct of the gem-diphenylol alkane so that it can be separated from the reaction mass, as taught in Canadian Pat. No. 576,491. Other methods are referred to in U.S. Pat. No. 3,073,868.

In certain applications, for instance in the production of polycarbonates, bisphenol-A is required having a purity very much higher than that obtained by presently known production methods. Purity, as applied to this art, therefore, includes the essential absence of (a) mono-functional substances, which could act as chain breakers, (b) tri- or higher functional substances which could act as cross-linkers, (c) colored substances, and (d) certain substances close to bisphenol-A in their physical and chemical properties, and which would interfere with the use of bisphenol-A as a starting material in the production of polycarbonates.

This problem of producing a bisphenol-A which will meet the desired specifications of plastics manufacturers is caused mainly by the fact that the organic impurities have physical and chemical properties which are widely divergent from each other. Some of the impurities which are chain breakers, such as phenol, isopropyl phenol, isopropenyl phenol, certain resinous substances, etc., have boiling points ranging from that of phenol up to that of bisphenol-A. The tri- and higher nuclear compounds range in boiling points from that of bisphenol-A to substances having almost no detectable vapor pressure. The solubilities of the impurities in any given solvent may range from being completely miscible to being practically insoluble, etc. The result is that neither a simple distillation, nor a simple crystallization, nor a simple extraction, nor any other simple process known so far is able to remove all classes of impurities and to produce an essentially pure product.

In copending application Ser. No. 791,281, filed Feb. 5, 1959, now U.S. Pat. No. 3,073,868, incorporated herein by reference, a method has been disclosed which produces bisphenol of plastics grade by the combination of a distillation followed by an extraction. The distillation removes substantially all substances boiling essentially below and above bisphenol, resulting in a product which contains essentially only bisphenol and impurities boiling close to bisphenol, which according to the teaching of the said disclosure can be removed by extraction of the resultant product with certain solvents.

This method of purification, although resulting in a product of excellent purity, has certain disadvantages. For most effective results, it requires numerous operations, namely, condensing of the bisphenol vapors, collecting the distillate, causing a slow crystallization of the distillate, breaking the distillate into grains, screening these grains, subjecting them to an extraction, separating the extracting liquid from the extracted solid, drying the extracted bisphenol-A, and separating the solvent from the extraction impurities.

There exists thus the need for a more efficient method of separating the impurities from bisphenol.

An obvious method would be crystallization from solvents, and this method has been suggested in numerous modifications. All of them, however, suffer from serious shortcomings, resulting from the following set of circumstances: The solvent to be used must be low boiling. High boiling solvents would tend to remain in the product, contaminating it, or the product would suffer from decomposition, or otherwise, in the attempt to free it from residual high boiling solvent. The solvent must further have a high solvent power for the impurities but a low solvent power for bisphenol, because otherwise no separation of the resinous impurities from bisphenol would be feasible.

The only class of solvents that thus can be used are low boiling solvents having a low solvent power for bisphenol.

In the process of extraction, this limitation is not only harmless, but even desirable. It permits the removal of the resinous impurities with comparatively small volumes of solvents without dissolving at the same time substantial quantities of bisphenol.

In a crystallization, however, a solvent combining low boiling point and low solvent power for bisphenol appears offhand as practically unsuitable, because of the presumably large quantities of solvent required to bring the whole material to be purified into solution.

According to thermodynamic principles the solubility of a substance in a solvent, expressed as the logarithm of its mol fraction, is linearly proportional to the reciprocal of absolute temperature, or, in other words, a plot of the solubility in mol fraction versus temperature on a graph paper having a logarithmic division on the ordinate and a reciprocal absolute temperature division as the abscissa, is a straight line going through the melting point.

According to the present invention, however, it has been found that bisphenol-A, as well as other gem-diphenylol alkanes, have the unexpected property of changing at a certain elevated temperature from a difficultly soluble material into an easily soluble material, and thus can be conveniently crystallized from solvents having low boiling points and low solvent power for bisphenol-A, by dissolving in the solvent the gem-diphenylol alkane to be crystallized at temperatures above those at which they acquire the abnormally high solubility, and then lowering the temperature to permit the gem-diphenylol alkane to crystallize therefrom.

This unexpected finding can be seen more readily in the FIGURE by comparing the solubility curve of 1,2,4,5-tetrachlorobenzene, which is a straight line going through its melting point of 138° C., with the solubility curves of the representative bisphenol compounds in various desirable solvents. Thus, the same graph shows further, measured and computed by the same method, the solubilities of bisphenol-A in benzene, methylene chloride, ethylene dichloride, trichloroethylene, and toluene, as well as those of bisphenol-B which is the condensation product of methyl-ethyl ketone with phenol, and of bisphenol-C which is the condensation product of cyclohexanone with phenol, in benzene.

Contrary to the general rule and expectation, all of these solubility graphs show a break in the straight line, indicating an abnormally high solubility above a certain temperature on each graph, near the atmospheric boiling point of the solvent. The reason, or reasons, for this phenomenon are unknown to us. This invention uses the abnormally and unexpectedly high solubility above the breakpoint for the purpose of crystallizing the bisphenol from comparatively small quantities of low boiling solvents having a low solvent power for bisphenol, by dissolving the gem-diphenylol alkane in them at temperatures above the breakpoint, i.e., above the atmospheric boiling point of the solution, and then crystallizing it therefrom by lowering the temperature.

This phenomenon is further illustrated in Table III showing the solubilities of bisphenol-A in benzene at various temperatures, and comparing them with the solubilities that would be expected from having extrapolated the solubility curve (which theoretically should be a straight line when plotting the solubility in mol fraction vs. temperature on graph paper having a logarithmic division on the ordinate and a reciprocal of absolute temperature as the abscissa) at atmospheric pressure conditions, to corresponding temperatures above the atmospheric boiling point of benzene.

TABLE III

[Solubility of bisphenol-A in benzene]

| Temp., °C. | Press., mm. Hg | A. Laboratory experiment | | B. Extrapolation | |
|---|---|---|---|---|---|
| | | Mol. fraction, BPA/benzene | Percent BPA in benzene | Mol. fraction, BPA/benzene | Percent BPA in benzene |
| 80.1 | 760 | 0.022/.978 | 6.16 | 0.02/.98 | 5.63 |
| 100 | 1,350 | 0.08/.92 | 20.2 | 0.037/.963 | 10.1 |
| 120 | 2,300 | 0.25/.75 | 49.4 | 0.058/.942 | 15.3 |
| 140 | 3,000 | 0.7/.30 | 87.5 | 0.095/.905 | 21.3 |

In Table III, column A illustrates the much greater solubility of bisphenol-A in benzene as the temperature of benzene is increased above its normal boiling point of 80.1° C. at 760 mm Hg (atmospheric pressure). This increase in solubility is considerably greater than would be expected by extrapolating a curve expressing the solubilities of bisphenol-A in benzene below 80° C. to conditions above 80° C. The data expressing a straight line extrapolation are given in column B, above. Curve 5, in the FIGURE illustrates this same phenomenon, namely, a much greater than anticipated solubility of bisphenol-A in benzene above 80° C., as compared with the dashed-line extrapolation of expected solubility. This unexpected discovery is the basis for our invention. Thus, even an operating range of 120°–160° C. (approximately 2,300 – 9,120 mm Hg pressure) has commercial potential.

From a consideration of the solubility curves in the FIGURE, considerably less solvent is required by the method of this invention than by conventional crystallization methods. For instance, when crystallizing bisphenol-A from benzene by the conventional crystallization methods, the solubility of 0.02 mol fraction of bisphenol-A at the atmospheric boiling point of benzene of about 80° C., would require about 50 mols of solvent per mol of product. Even an increase of the temperature to, for instance, about 140° C. would be expected (by the dashed-line extrapolation of the solubility Curve 5) to result in an increase of the solubility to only 0.09, with a corresponding lowering of the solvent requirement to about 10 mols of solvent per mol of product. Actually, however, according to the present invention, the solubility at 140° C. is 0.7 mol fraction, with corresponding lowering of the solvent requirement to only about 0.5 mols of solvent per mol of product, which is a 20-fold increase in solubility over that which would have been expected.

Since the breakpoints occur in the general vicinity of the atmospheric boiling points of the solvents, it is generally advantageous, according to the present invention, to crystallize the gem-diphenylol alkane from low boiling solvents, having a low solvent power for bisphenol, such as benzene, toluene, methylene chloride, ethylene dichloride and trichloroethylene, at a temperature above the atmospheric boiling point of the solution under pressure at least equal to its vapor pressure at that temperature.

In carrying out the crystallization from above the atmospheric boiling point of the resultant material, it is preferred to use enough solvent to dissolve substantially all the gem-diphenylol alkane at the maximum temperature to be used. Not all the gem-diphenylol alkane need be dissolved at that temperature, however, where the suspension of undissolved gem-diphenylol alkane is of a particle size or shape capable of having its impurities extracted from it. Larger quantities of solvent may also be used. However, it may no longer be economically advantageous to operate at elevated pressures and temperatures above the atmospheric boiling point of the resulting material, when the amount of solvent used is the same as that required for a recrystallization at the atmospheric boiling point of the resulting material. Preferably, the amount of solvent should be less than that amount which would be expected from extrapolating a curve of solubility of the gem-diphenylol alkane, as the logarithm of mol fraction in the solvent (as the ordinate) against the reciprocal of the absolute temperature (as the abscissa), from solubilities at temperatures below the atmospheric boiling point of the resultant material to temperatures above the atmospheric boiling point. In the FIGURE, this amount would be determined from extrapolating the straight line solubility curve from below the atmospheric boiling point, through its breakpoint into elevated temperatures.

Since each particular gem-diphenylol alkane has a different solubility curve for each solvent specified, and further since the amount of solvent to be used depends on the temperature of operation, it is not possible to define the amount of solvent to be used in terms of specific proportions.

The crystallization of the gem-diphenylol alkane can be carried out by various techniques. For instance, the bisphenol can be dissolved in the solvent in a closed, pressure-tight vessel at a temperature substantially above the atmospheric boiling point of the solution while maintaining an elevated pressure, and then the resultant material in the vessel can be brought to a lower temperature by cooling, preferably with agitation, whereby most of the bisphenol crystallizes out in the form of a slurry, and can be recovered from the slurry by filtering, centrifuging or similar means.

Crystallization can be effected by releasing the pressure, for instance, through a condenser, whereby the temperature is lowered to approximately the atmospheric boiling point of the solution. Still other methods of cooling and inducing crystallization can be used, and combinations of these methods can also be used.

Our preferred method is to inject continuously a solution of the bisphenol in the solvent at a temperature above the solubility breakpoint of the solvent, especially at a temperature above the atmospheric boiling point of the resultant material, into or near the bottom of a tank maintained at about atmospheric pressure and connected to the atmosphere through a condenser, in which a slurry of bisphenol crystals in the solution is maintained at about the atmospheric boiling point, and from which this slurry continuously overflows, either for further cooling by external means or by flashing into a vacuum, or directly to a means for separating the crystals from the mother liquor. The mother liquor is continuously vaporized, leaving the extract as a residue. This extract can preferably be recirculated for reuse in the reaction step of the overall process.

The following examples are given to demonstrate how the fact of the discovered breakpoint in the solubility curves of gem-diphenylol alkanes in certain relatively low boiling solvents can be utilized to crystallize and purify the gem-diphenylol alkane. These examples are for illustrative purposes and we do not want to be limited to them, except as defined in the appended claims.

EXAMPLE 3

Four hundred grams of crude distilled 2,2-bis(4-hydroxyphenyl) propane (bisphenol-A), having a freezing point of 154.5° C. and containing impurities of the kind and portions shown in Table 1, were dissolved in 600 grams of methylene chloride at a temperature of 150° C. under pressure of 250 psig. The solution was allowed to cool to room temperature with agitation and the crystals of bisphenol-A were separated from the mother liquor by filtration. There were recovered 376 grams of bisphenol-A having a freezing point of 156.7° C. This compares favorably with the results shown in the fourth column of Table 11.

When a crude bisphenol-A (that is, a bisphenol-A which has not been subjected to a "flash" distillation) having a freeze point of 153° C. is treated in accordance with Example 1, the freeze point of the product is 155° C.

EXAMPLE 4

Commercial bisphenol-A, probably made in accordance with U.S. Pat. No. 182,308, in flake form, having a freezing point of 153.9° C. and a relative transparency of 28 percent, was distilled with the shortest possible holding time under a vacuum of less than about 5 mm of mercury in glass equipment. Four hundred and fifty grams of the distillate were dissolved in 300 g. of benzene maintained at a temperature of about 155° C. and a pressure of 65 psig. The solution was cooled by gradually releasing the pressure causing part of the benzene to flash off and lowering the temperature of the solution to approximately the atmospheric boiling point of benzene. The resulting slurry was filtered and 430 grams of bisphenol-A, having a freezing point of 156.9° grams of bisphenol-A, having a freezing point of 156.9° C., were recovered.

EXAMPLE 5

A current of condensate from the vacuum distillation of crude bisphenol-A, prepared in accordance with the method of U.S. Pat. No. 3,073,868, having a temperature of about 165° C., was mixed continuously at the rate of 10,300 kg/hr with 19,600 kg/hr of benzene preheated to 90° C. under a pressure of 40 lb. The mixture was continuously introduced into the bottom of a vessel equipped with an agitator and filled with a slurry of bisphenol-A crystals in benzene, connected to a benzene condenser with an outlet to the atmosphere. Part of the benzene flashed off upon release of the pressure, reducing the temperature of the slurry close to that of the boiling point of benzene and precipitating most of the bisphenol-A in form of crystals having a freezing point of 156.8° C.

The slurry overflows continuously from this vessel to a centrifuge where the crystals are separated from the mother liquor. It has been found advantageous to have a second vessel equipped with agitation between the flashing vessel and the centrifuge in which the temperature of the slurry is reduced by means of cooling with chilled water close to room temperature. The mother liquor from the centrifuge is separated by distillation into benzene, which is recycled, and impurities which are added to the production of bisphenol-A as explained in copending application Ser. No. 791,281, now U.S. Pat. No. 3,073,868.

Similarly, where some other gem-diphenylol alkane is to be purified of organic impurities, the manner taught above with respect to bisphenol-A can also be used. For instance, bisphenol-B (2,2-bis(4-hydroxyphenyl)butane) and bisphenol-C (1,1-bis(4-hydroxyphenyl) cyclohexane) can also be crystallized from any one of the solvents defined in this invention, namely those selected from the group consisting of benzene, toluene, methylene chloride, ethylene dichloride, and trichloroethylene. Other gem-diphenylol alkanes obtained by the condensation of a phenol and an organic carbonyl compound, such as those mentioned in Canadian Pat. No. 576,491, which are incorporated by reference herein, may also be crystallized in accordance with the teaching of this invention.

Gem-diphenylol alkanes are produced by other reactions, such as the reaction under the influence of Friedel-Crafts or Lewis acid catalysts (e.g., $BF_3$) of a phenol with substances containing a triple bond (e.g., propyne) or adjacent double bonds (e.g., allene or propadiene). Thus, the gem-diphenylol alkanes to be purified by the process of this invention are derived from a monohydroxy monocyclic phenol having substituents on the ring selected from the group consisting of hydrogen, halogen, including chloro, bromo, iodo and fluoro, nitro, saturated alkyl having from one to 18 carbon atoms, and mixtures thereof. Typical of such phenols are phenol itself ($C_6H_5OH$), o-chloro phenol, dichloro phenol, o-bromo phenol, o-iodo phenol, o-fluoro phenol, m- and p-cresol, xylenol, ethyl phenol, isooctyl phenol, isopropyl phenol, octyl phenol, meta-nitro phenol, 2-methyl-6-isooctyle phenol, and 2,6-dinitro phenol.

The organic carbonyl compound to be used in producing the gem-diphenylol alkane is selected from ketones and aldehydes, having one to 18 carbon atoms, including straight chain, cycloaliphatic and alkaryl ketones and aldehydes, such as acetone, methyl ethyl ketone, methyl isobutyl ketone, cyclohexanone, 1-phenyl-2-propanone, 3,3-dimethyl-2-butanone, 3,3-diphenyl-2-butanone, 3-pentanone, 2-heptanone, 2-decanone, acetophenone, desoxybenzoin, formaldehyde, butyraldehyde, acetaldehyde, propionaldehyde, benzaldehyde, o-, m-, and p-tolualdehyde, phenyl acetaldehyde, and the like.

Specific examples of some of the compounds which are prepared by the condensation reaction and which may be purified by the process of this invention include:
bis(2-hydroxyphenyl)methane;
bis(4-hydroxyphenyl)methane;
1,1-bis(2-hydroxyphenyl)ethane;
1,1-bis(4-hydroxyphenyl)ethane;
1,1-bis(2-hydroxyphenyl)propane;
1,1-bis(4-hydroxyphenyl)propane;

1,1-bis(2-hydroxyphenyl)butane;
1,1-bis(4-hydroxyphenyl)butane;
2,2-bis(4-hydroxyphenyl)propane;
2,2-bis(4-hydroxyphenyl)butane;
2,2-bis(2-hydroxyphenyl)propane;
bis(2-hydroxy-3-methylphenyl)methane;
1,1-bis(2-hydroxy-3-methylphenyl)ethane;
1,1-bis(2-hydroxy-3-methylphenyl)propane;
1,1-bis(2-hydroxy-3-methylphenyl)butane;
1,1-bis(2-hydroxy-3-methylphenyl)isobutane;
bis(2-hydroxy-4-methylphenyl)methane;
1,1-bis(2-hydroxy-4-methylphenyl)ethane;
1,1-bis(2-hydroxy-4-methylphenyl)propane;
1,1-bis(2p-hydroxy-4-methylphenyl)butane;
1,1-bis(2-hydroxy-4-methylphenyl)isobutane;
bis(2-hydroxy-5-methylphenyl)methane;
1,1-bis(2-hydroxy-5-methylphenyl)ethane;
1,1-bis(2-hydroxy-5-methylphenyl)propane;
1,1-bis(2-hydroxy-5-methylphenyl)butane;
1,1-bis(2-hydroxy-5-methylphenyl)isobutane;
bis(2-hydroxy-3-ethylphenyl)methane;
1,1-bis(2-hydroxy-3-ethylphenyl)ethane;
1,1-bis(2-hydroxy-3-ethylphenyl)propane;
1,1-bis(2-hydroxy-3-ethylphenyl)butane
1,1-bis(2-hydroxy-3-ethylphenyl)isobutane;
1,1-bis(2-hydroxy-3-isopropylphenyl)propane;
1,1-bis(2-hydroxy-3-sec-butylphenyl)propane;
1,1-bis(2-hydroxy-3-t-butylphenyl)propane; and the like.

Example 6 shows the preparation of bis-xylenol-A from the condensation of 2,6-xylenol and acetone in accordance with the following equation:

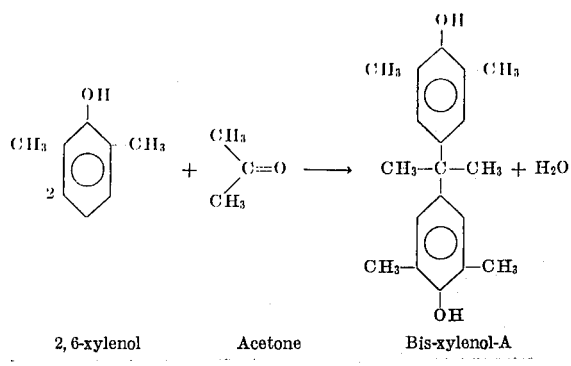

2,6-xylenol    Acetone    Bis-xylenol-A

EXAMPLE 6

2,6-Xylenol (1342 grams) (11 mols) and 290 grams acetone (5 mols) were reacted at 75° C. for 72 hours using hydrogen chloride as catalyst. Crude bis-xylenol-A (875 grams) was obtained. This was then distilled and 854 grams of distilled bis-xylenol-A were obtained. The bis-xylenol-A was then recrystallized from benzene. Pure bis-xylenol-A (721 grams) was obtained having a freezing point of 165.3° C. Recrystallization of the distilled bis-xylenol-A from benzene at elevated temperature and pressure above the atmospheric boiling point of the resultant material also yields the pure product having the same freeze point; however, since considerably less benzene is used, the yield of bis-xylenol-A is greater.

The process of this invention is especially suited for purifying gem-diphenylol alkane material which has been previously subjected to a purification wherein the gem-diphenylol alkane has been distilled to remove materials more and less volatile than it, such as by the process described in said Ser. No. 791,281, now U.S. Pat. No. 3,073,868, but also in Ser. No. 176,923, filed Mar. 2, 1962, now U.S. Pat. No. 3,207,795, and Ser. No. 248,279, filed Dec. 31, 1962, now U.S. Pat. No. 3,290,391. A specific distillation process is shown in Ser. No. 220,617, filed Aug. 31, 1962, now U.S. Pat. No. 3,219,549. However, other prior purification treatments may also be used, such as wherein the gem-diphenylol alkane has been distilled to remove materials more volatile than it.

The process, of course, can also be used to purify gem-diphenylol alkanes which have had no prior distillation, or which have had other prior treatments, such as those processes which wash the gem-diphenylol alkane with phenol or other washing material.

The process of this invention is especially useful in purifying gem-diphenylol alkanes containing essentially only impurities boiling close to the gem-diphenylol alkane itself. For, under the conditions of prior distillation(s) or other prior treatment some impurities are left in the gem-diphenylol alkane.

While the invention has been illustrated with the purification of crude gem-diphenylol alkanes which have been subjected to at least one distillation to remove volatile impurities, it is to be understood that gem-diphenylol alkanes which have not been subjected to this prior treatment may also be purified by the method of this invention. There are several known methods of working up gem-diphenylol alkanes, including using the same solvents, but none employ the process described and claimed herein.

It is to be understood that the crystallization process of this invention is to be carried out by dissolving the gem-diphenylol alkane in the solvent while maintaining the resultant material (e.g., solution) at a temperature substantially above the atmospheric boiling point, i.e., reflux temperature, of the solution (not the condensing liquid above the solution). Thus, in order to do this, the vessel containing the resultant material will be maintained at an elevated pressure at least as high as the vapor pressure of the liquid at that temperature. Pressure equipment would normally be used for this purpose and in order to economically justify its use, the temperature to be used should be well above the atmospheric boiling point of the solution, or resultant material, of gem-diphenylol alkane in the solvent, e.g., at least 5° C. above the atmospheric boiling point of the resultant material, and more preferably 10° to 80° C. above the atmospheric boiling temperature of the resultant material. For instance, when purifying gem-diphenylol propane by crystallization from benzene (whose atmospheric boiling temperature would be about 80° C.), it is preferred to operate at about 120° to 140° C. Thus, in order to operate at these temperatures, the operating pressure should be between greater than 1 atmosphere (760 mm Hg) and about 12 atmospheres (9,120 mm Hg) necessary to maintain the resultant material at the maximum desired temperature.

It is also to be understood that the invention is not to be limited to the removal of impurities of the kind present in the crude reaction product when the gem-diphenylol alkane is made by the condensation of a phenol with an organic carbonyl compound. The purification process of this invention can also be used to remove other impurities which may be present in a gem-diphenylol alkane, for the invention rests in the discovery that there is an unexpected increase in the solubility of the gem-diphenylol alkane in the solvent at temperatures above the atmospheric boiling point of the resulting material, and appears to be independent of the nature of the impurity.

Various modifications can be made by one of ordinary skill in this art without departing from the scope of this invention and we do not wish to be limited thereto, except as defined in the appended claims.

WE CLAIM:

1. The process for purifying a gem-diphenylol alkane from impurities derived from the condensation of an organic carbonyl compound and a monohydroxy phenol having substituents on the ring selected from the group consisting of hydrogen, halogen, nitro, saturated alkyl having from one to 18 carbon atoms, and mixtures thereof, which comprises:

1. dissolving the gem-diphenylol alkane in a solvent at a temperature at least 5° C. above the atmospheric boiling point and at a pressure above the vapor pressure of the resultant material at that temperature, said solvent being present in an amount necessary to dissolve substantially all said gem-diphenylol alkane and less than an amount required for a recrystallization at the atmospheric boiling point of the resulting material, and said solvent being selected from the group consisting of benzene, toluene, methylene chloride, ethylene dichloride, and trichlorethylene;

2. cooling said resultant material, and recovering the resultant crystals of gem-diphenylol alkane therefrom.

2. The process according to claim 1 wherein the gem-diphenylol alkane is 2,2-bis(4-hydroxyphenyl) propane and the solvent is benzene.

3. The process according to claim 1 wherein the gem-diphenylol alkane is 2,2-bis(4-hydroxyphenyl) propane and the solvent is toluene.

4. The process according to claim 1 wherein the gem-diphenylol alkane is 2,2-bis(4-hydroxyphenyl) propane and the solvent is methylene chloride.

5. The process according to claim 1 wherein the gem-diphenylol alkane is 2,2-bis(4-hydroxyphenyl) propane and the solvent is ethylene dichloride.

6. The process according to claim 1 wherein the gem-diphenylol alkane is 2,2-bis(4-hydroxyphenyl) propane and the solvent is trichloroethylene.

7. The process according to claim 1 wherein the gem-diphenylol alkane is 2,2-bis(4-hydroxyphenyl) butane.

8. The process according to claim 1 wherein the gem-diphenylol alkane is 2,2-bis(4-hydroxyphenyl) butane and the solvent is benzene.

9. The process according to claim 1 wherein the gem-diphenylol alkane is 1,1-bis(4-hydroxyphenyl) cyclohexane and the solvent is benzene.

10. The process according to claim 1 wherein the gem-diphenylol alkane is 1,1-bis(4-hydroxyphenyl) cyclohexane and the solvent is benzene.

11. The process according to claim 1 wherein the cooling is effected by reducing the pressure on the said resultant material.

12. The process according to claim 1 wherein the cooling is effected by injecting the said resultant material into a slurry of said gem-diphenylol alkane in said solvent maintained at a pressure lower than the pressure of the material being injected.

13. The process according to claim 1 wherein the gem-diphenylol alkane has been previously subjected to a purification wherein the gem-diphenylol alkane has been distilled to remove materials more volatile than it.

14. The process according to claim 1 wherein the unsubstituted gem-diphenylol alkane has been previously subjected to a purification wherein the gem-diphenylol alkane has been distilled to remove materials more and less volatile than it.

15. The process for purifying a gem-diphenylol alkane selected from the group consisting of 2,2-bis(4-hydroxyphenyl) propane, 2,2-bis(4-hydroxyphenyl) butane, and 1,1-bis(4-hydroxyphenyl) cyclohexane containing essentially only impurities, produced by condensing phenol and an organic carbonyl compound and boiling close to the gem-diphenylol alkane, which comprises:

1. dissolving the gem-diphenylol alkane in a solvent at a temperature at least 5° C. above the atmospheric boiling point and at a pressure above the vapor pressure of the resultant material at that temperature, said solvent being present in an amount necessary to dissolve substantially all said gem-diphenylol alkane and less than an amount required for a recrystallization at the atmospheric boiling point of the resulting material, and said solvent being selected from the group consisting of benzene, toluene, methylene chloride, ethylene dichloride, and trichloroethylene;

2. cooling said resultant material, and recovering the resultant crystals of gem-diphenylol alkane therefrom.

16. The process according to claim 15 wherein the gem-diphenylol alkane is 2,2-bis(4-hydroxyphenyl) propane and the solvent is benzene.

17. The process according to claim 15 wherein the gem-diphenylol alkane is 2,2-bis(4-hydroxyphenyl) propane and the solvent is toluene.

18. The process according to claim 15 wherein the gem-diphenylol alkane is 2,2-bis(4-hydroxyphenyl) propane and the solvent is methylene chloride.

19. The process according to claim 15 wherein the gem-diphenylol alkane is 2,2-bis(4-hydroxyphenyl) propane and the solvent is ethylene dichloride.

20. The process according to claim 15 wherein the gem-diphenylol alkane is 2,2-bis(4-hydroxyphenyl) propane and the solvent is trichloroethylene.

21. The process according to claim 15 wherein the gem-diphenylol alkane is 2,2-bis(4-hydroxyphenyl) butane.

22. The process according to claim 15 wherein the gem-diphenylol alkane is 2,2-bis(4-hydroxyphenyl) butane and the solvent is benzene.

23. The process according to claim 15 wherein the gem-diphenylol alkane is 1,1-bis(4-hydroxyphenyl) cyclohexane.

24. The process according to claim 15 wherein the gem-diphenylol alkane is 1,1-bis(4-hydroxyphenyl) cyclohexane and the solvent is benzene.

25. The process according to claim 15 wherein the cooling is effected by reducing the pressure on the said resultant material.

26. The process according to claim 15 wherein the cooling is effected by injecting the said resultant material into a slurry of said gem-diphenylol alkane in said solvent maintained at a pressure lower than the pressure of the material being injected.

27. The process according to claim 15 wherein the gem-diphenylol alkane has been previously subjected to a purification wherein the gem-diphenylol alkane has been distilled to remove materials more volatile than it.

28. The process according to claim 15 wherein the gem-diphenylol alkane has been previously subjected to a purification wherein the gem-diphenylol alkane has been distilled to remove materials more and less volatile than it.

* * * * *

PO-1050
(5/69)

UNITED STATES PATENT OFFICE
CERTIFICATE OF CORRECTION

Patent No. 3,673,262      Dated June 27, 1972

Inventor(s) Walter H. Prahl and Sol J. Lederman

It is certified that error appears in the above-identified patent and that said Letters Patent are hereby corrected as shown below:

Column 1, lines 72 and 73, "1 70°C" should read ---170°C---. Column 2, line 9, "12-o-" should read --- -2-o- ---. Column 3, line 15, "2,800" should read ---2820---. Column 7, line 60, "182,308" should read ---2,182,308---; line 72, delete. Column 8, line 54, "octyle" should read ---octyl---. Column 9, line 14, "2p-" should read --- 2- ---. Column 11, line 29, Claim 9, delete "and the solvent is benzene"; and line 53, Claim 15, the comma should be omitted.

Signed and sealed this 2nd day of January 1973.

(SEAL)
Attest:

EDWARD M. FLETCHER, JR.
Attesting Officer

ROBERT GOTTSCHALK
Commissioner of Patents